United States Patent [19]

Peters

[11] Patent Number: 4,665,748
[45] Date of Patent: May 19, 1987

[54] AUTOMATIC CONTINUOUS NULLING OF ANGULAR RATE SENSOR

[75] Inventor: Rex B. Peters, Woodinville, Wash.

[73] Assignee: Sundstrand Data Control, Inc., Redmond, Wash.

[21] Appl. No.: 789,655

[22] Filed: Oct. 21, 1985

[51] Int. Cl.[4] ............................................. G01P 3/46
[52] U.S. Cl. ..................................... 73/505; 73/510
[58] Field of Search ................... 73/505, 510, 517 R, 73/517 AV

[56] References Cited

U.S. PATENT DOCUMENTS 4,510,802  4/1985  Peters .................................... 73/505

Primary Examiner—Michael J. Tokar
Assistant Examiner—John E. Chapman, Jr.
Attorney, Agent, or Firm—Christensen, O'Connor, Johnson & Kindness

[57] ABSTRACT

An angular rate sensor comprising a pair of accelerometers that includes means for continuously nulling error signals resulting from misalignment of the accelerometers. The first accelerometer (10) has a first force sensing axis and produces a first output signal ($a_1$) indicating acceleration along the first force sensing axis. The second accelerometer (12) has a second force sensing axis and produces a second output signal ($a_2$) indicating acceleration along the second force sensing axis. The accelerometers are mounted by mounting means such that their force sensing axes are both parallel to a common sensing axis and such that the accelerometers can be moved along a vibration axis normal to the sensing axis. A signal generator (76) produces a periodic deive signal having a predetermined frequency, and drive means (80, 82, 84) connected to the mounting means is responsive to the drive signal for vibrating the first and second accelerometers along the vibration axis at the predetermined frequency. Signal processing means (104) receives the first and second output signals and generates a Coriolis signal representing the Coriolis acceleration along the sensing axis resulting from movement of the accelerometers along the vibration axis and rotation of the body about a rate axis normal to the vibration axis and to the sensing axis. The signal processing means includes the detection means (92) that receives the Coriolis signal and produces a feedback signal that is a function of those components of the Coriolis signal that are in phase with respect to the drive signal. The drive means includes means (80) for combining the feedback signal with the drive signal, such that the in phase components are continuously driven towards a null value.

16 Claims, 4 Drawing Figures

AUTOMATIC CONTINUOUS NULLING OF ANGULAR RATE SENSOR

TECHNICAL FIELD

The present invention relates to an apparatus for determining angular rate of rotation utilizing accelerometers.

BACKGROUND OF THE INVENTION

Angular rate of rotation about a given coordinate axis may be measured by moving (e.g., vibrating) an accelerometer along an axis normal to the accelerometer's sensitive axis and normal to the rate axis about which rotation is to be measured. For example, consider a set of X, Y, Z coordinate axes fixed in a body whose rotation rate is to be measured, and an accelerometer also fixed in the body with its sensitive axis aligned along the Z axis. If the angular rotation vector of the body includes a component along the X axis, then periodic motion of the accelerometer along the Y axis will result in a periodic Coriolis acceleration acting in the Z direction that will be sensed by the accelerometer. The magnitude of the Coriolis acceleration is proportional to the rotation rate about the X axis. As a result, the output of the accelerometer includes a DC or slowly changing component that represents the linear acceleration of the body along the Z axis and a periodic component that represents the rotation of the body about the X axis. The accelerometer output can be processed, along with the outputs of accelerometers that have their sensitive axes in the X and Y directions and that are moved along the Z and X axes, respectively, to yield linear acceleration and angular rate about the X, Y and Z axes. Such signal processing is described in U.S. Pat. No. 4,445,376 and in U.S. Pat. No. 4,590,801 entitled "Apparatus for Measuring Inertial Specific Force and Angular Rate of a Moving Body".

As described in the latter patent, one preferred embodiment of a rotation rate sensor comprises, for each axis, two accelerometers oriented with their sensitive axes parallel or antiparallel to one another and means for vibrating the accelerometers along an axis normal to their sensitive axes. A suitable method for vibrating such accelerometer pairs is described in U.S. Pat. No. 4,510,802. In the system described in that patent, a parallelogram structure is used to vibrate the accelerometers along a common vibration axis. In such an arrangement, it may be demonstrated that angular misalignment of the two accelerometers with respect to the desired sensitive axis interacts with any phase shift that may exist between the vibration drive signal and the actual vibratory motion to produce a rate bias given by:

$$\Omega_b = (\omega/4)(\alpha_1 + \alpha_2)\sin\psi \quad (1)$$

where $\omega$ is the vibration frequency, $\alpha_1$ and $\alpha_2$ are the misalignments of the first and second accelerometers respectively and $\Phi$ is the phase shift. The referenced application describes a process, using the characteristics of a parallelogram linkage, to set $(\alpha_1 + \alpha_2)$ and $\Phi$ essentially to zero. However to achieve a bias stability of, for example, 0.02 degrees/hour, it is still necessary that the phase shift and misalignment angles be stable to the order of 15 microradians each. In a gas damped accelerometer, where phase shift at the vibration frequency may be a few degrees, and where stability better than a few hundred microradians cannot be guaranteed, alignment stability becomes extremely critical, and an improved technique is desirable for minimizing the rate bias set forth in Equation (1) above.

SUMMARY OF THE INVENTION

The present invention provides an angular rate sensor that comprises a pair of accelerometers and that includes means for continuously nulling error signals resulting from misalignment of the accelerometers.

In one embodiment, the rate sensor of the present invention comprises first and second accelerometers. The first accelerometer has a first force sensing axis and produces a first output signal indicating acceleration along the first force sensing axis. The second accelerometer has a second force sensing axis and produces a second output signal indicating acceleration along the second force sensing axis. Mounting means are provided for mounting the accelerometers such that their force sensing axes are both parallel to a common sensing axis, and such that the accelerometers can be moved along a vibration axis normal to the sensing axis. A signal generator produces a periodic drive signal having a predetermined frequency, and drive means connected to the mounting means is responsive to the drive signal for vibrating the first and second accelermeters along the vibration axis at said predetermined frequency. Signal processing means receives the first and second output signals and generates a Coriolis signal representing the Coriolis acceleration along the sensing axis resulting from movement of the accelerometers along the vibration axis and rotation of the body about a rate axis normal to the vibration axis and to the sensing axis.

Ideally, the only component of the Coriolis signal would be that due to the Coriolis acceleration, which component is in phase with the vibration velocity and therefore in quadrature phase with respect to the drive signal. Components of the Coriolis signal that are in phase with the drive signal represent errors due to misalignment or angular accelerations. The signal processing means includes detection means that receives the Coriolis signal and produces a feedback signal that is a function of those "error" components of the Coriolis signal that are in phase with respect to the drive signal. The drive means includes means for combining the feedback signal with the drive signal, such that the in phase components are driven toward a null value. The detection means preferably comprises means for producing an analog signal having a magnitude corresponding to the amplitude of the components of the Coriolis signal that are in phase with respect to the drive signal, and means for integrating the analog signal to produce the feedback signal. The mounting means preferably comprises a parallelogram mechanism.

DETAILED DESCRIPTION OF THE INVENTION

Figure 1:
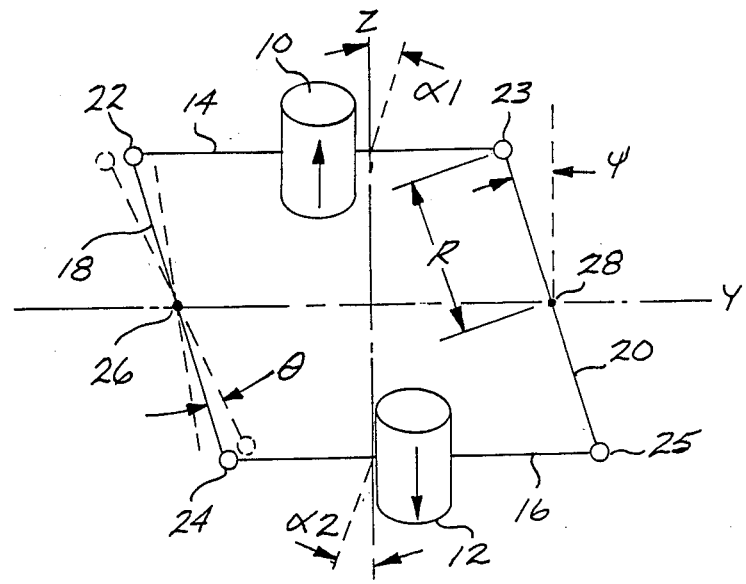
FIG. 1 is a diagram providing a conceptual illustration of a parallelogram assembly for vibrating two accelerometers along a vibration axis.

FIG. 1 schematically illustrates a parallelogram arrangement for vibrating accelerometers 10 and 12 along the Y axis. The accelerometers have their sensitive axes substantially parallel to the Z axis and antiparallel to one another, the sensitive axis of accelerometer 10 being directed in a positive direction along the Z axis and the sensitive axis of accelerometer 12 being directed in a negative direction along the Z axis. Accelerometers 10 and 12 are secured to accelerometer support members 14 and 16, respectively, that in turn are connected to a pair of linkage members 18 and 20 by pivots 22-25. Linkage members 18 and 20 are mounted at central pivots 26 and 28, respectively. Support members 14 and 16 are both parallel to the Y axis. When linkage members 18 and 20 are vibrated about central pivots 26 and 28, respectively, through angles $\pm\theta$, accelerometers 10 and 12 will vibrate along the Y axis with an amplitude of approximately $\pm R\ \theta$, where R represents the length of the linkage arm 18 or 20 from one of the central pivots 26 or 28 to one of pivots 22-25. In FIG. 1, the angle $\psi$ represents an initial offset (with respect to the Z axis) about which such vibration occurs, and the angles $\alpha_1$ and $\alpha_2$ represent the angular misalignment of the sensitive axes of accelerometers 10 and 12 respectively with respect to the Z axis.

When a sinusoidal drive force is applied to the arrangement of FIG. 1, the accelerations along the Y and Z axes resulting from the motion of the accelerometers are as follows:

$$A_Y = \omega^2 R\ \theta \cos\psi \sin\omega t \quad (2)$$

$$A_Z = \omega^2 R\theta \sin\psi \sin\omega t + \omega^2 R\theta^2 \cos\psi \cos 2\omega t \quad (3)$$

where $\omega$ represents the angular frequency of vibration through angle $\theta$. In Equations (2) and (3) above, it is assumed that the drive force is proportional to sin $\omega t$, i.e., that the drive force is zero at time zero. Equation (2) and the first term in Equation (3) represent back-and-forth movement of each accelerometer along a "vibration axis" that is inclined at an angle $\psi$ with respect to the Y axis. The second term in Equation (2) represents a twice frequency acceleration resulting from the fact that the movement of each accelerometer is circular rather than truly linear. The acceleration along the Z axis ($A_Z$) of accelerometers 10 and 12 due to vibration by the mechanism illustrated in FIG. 1 is relatively small for small values of $\theta$ and $\psi$, and will essentially cancel out in the signal processor described below in connection with FIGS. 3 and 4. The motion of accelerometers 10 and 12 is therefore essentially linear along the Y axis for small angles of $\theta$ and $\psi$. The angular amplitude $\theta$ preferably has a value of 0.01-0.1 radians, and $\psi$ preferably has a value of less than 0.01 radians. Suitable values for the frequency $\omega$ are in the range of 200-1000 radians/second. Further significance of the input axis motion described in Equations (2) and (3) will be discussed below in connection with FIGS. 3 and 4.

Figure 2:
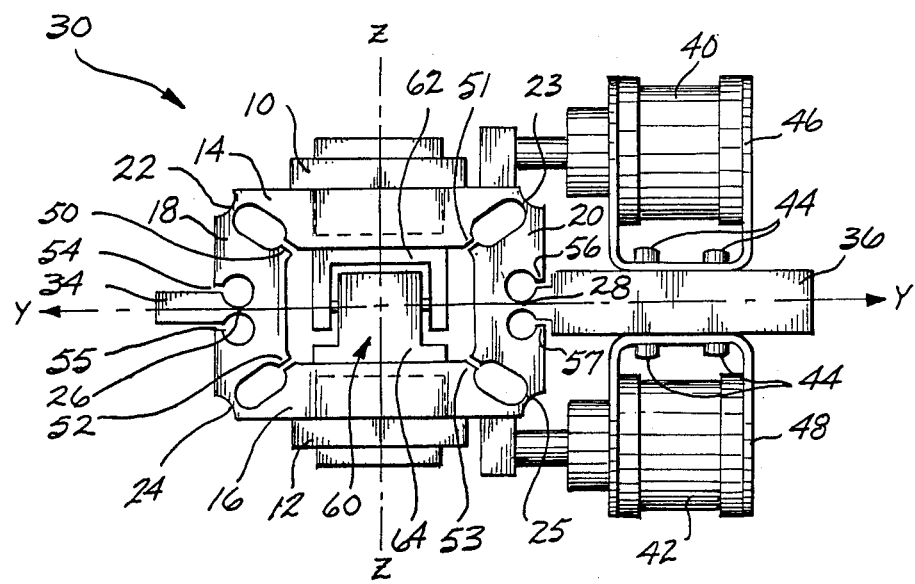
FIG. 2 is a side elevational view of a mechanism for implementing the parallelogram assembly illustrated in FIG. 1.

FIG. 2 illustrates one preferred embodiment of an accelerometer assembly 30 that includes accelerometers 10 and 12 mounted in the parallelogram arrangement indicated in FIG. 1. In FIGS. 1 and 2, the same reference numerals are used for corresponding parts. Accelerometers 10 and 12 are secured to the accelerometer support members 14 and 16, and the accelerometer support members are in turn secured to linkage members 18 and 20 by flexure hinges 22-25. Linkage members 18 and 20 are in turn secured to fixed supports 34 and 36 by flexure hinges 26 and 28, respectively, flexure hinges 22-25, 26 and 28 corresponding to pivots 22-25, 26 and 28 respectively of FIG. 1. Vibration of the accelerometers along the Y axis is effected by solenoids 40 and 42. The solenoids are secured to fixed support 36 by bolts 44 and by brackets 46 and 48. Solenoid 40 is coupled to support member 14 and solenoid 42 is coupled to support member 16. The solenoids are driven 180° out of phase with one another, to cause back-and-forth motion of the accelerometers along the Y axis. Excessive vibrational movement of the apparatus is prevented by shock stops 50-53 between the support members and linkage members, and by shock stops 54-57 between fixed supports 34 and 36 and linkage members 18 and 20. The vibrational position of the parallelogram assembly is measured by LVDT 60 mounted between bracket 62 secured to support member 14 and bracket 64 secured to support member 16.

Means other then solenoids 40 and 42 may be used to vibrate accelerometer assembly 30 along the Y axis. Thus the drive means could comprise an electromagnetic voice coil mechanism connected to linkage members 18 and 20, or a D'Arsonval torque coil attached between support 36 and linkage member 20. The drive means could also comprise piezoelectric bender elements. Furthermore as described below, the position sensing means is not required to have a DC response, and LVDT 60 could therefore be replaced with an electromagnetic velocity coil mechanism or with other conventional position or motion sensing means. A number of suitable, alternate drive and position or velocity sensing techniques are described in U.S. Pat. No. 4,510,802 and in the U.S. Pat. No. 4,590,801.

Figure 3:
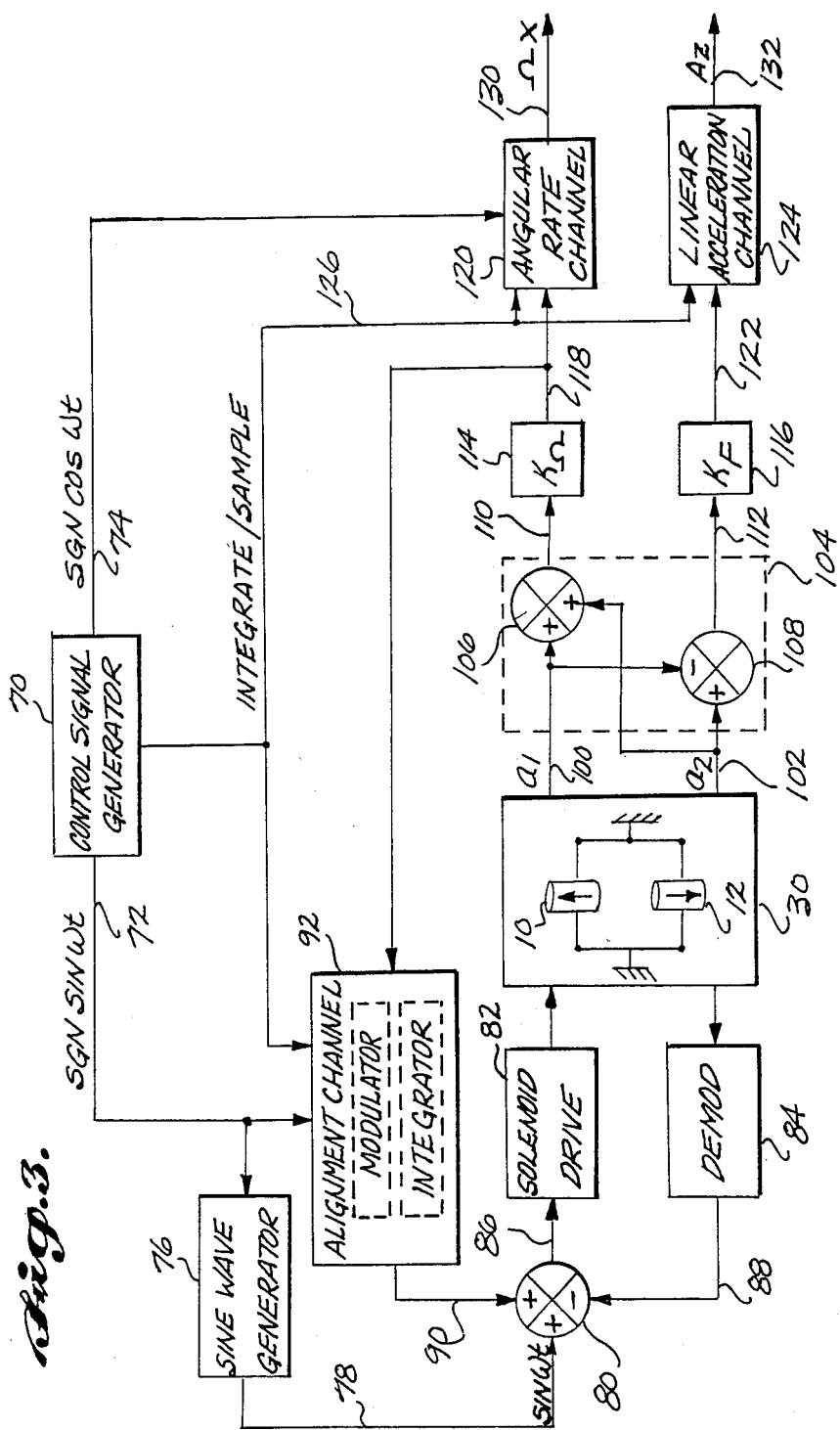
FIG. 3 is a block diagram of a system according to the present invention for determining angular rate using analog accelerometers.

The vibrational movement of accelerometers 10 and 12 along the Y axis interacts with rotational movement of the body in which the accelerometers are mounted about the X axis (perpendicular to the plane of FIGS. 1 and 2), to produce a Coriolis acceleration directed along the Z axis. The output of accelerometers 10 and 12 will therefore include a component representing linear acceleration along the Z axis, as well as a second component representing a Coriolis acceleration due to vibration along the Y axis and rotation about the X axis. A signal processor for separating the linear acceleration signal from the angular rate signal in the output signals of accelerometers 10 and 12 is illustrated in FIG. 3. It is assumed that the accelerometers are vibrated by a drive mechanism that provides a drive signal that is synchronous (i.e., in phase) with the function sin $\omega t$, where $\omega$ is the vibration frequency. Therefore, aside from a small phase shift between the drive signal and the actual vibrating motion of the accelerometers, the velocity of the accelerometers along the Y axis is synchronous with cos $\omega t$. In FIG. 3, control pulse generator 70 generates signals on lines 72 and 74 that represent the functions SGN sin $\omega t$ and SGN cos $\omega t$, respectively. The symbol SGN represents "sign of". By way of example, the signal on line 72 may comprise a series of pulses occurring at phase value 0, $\pi$, $2\pi$, etc. of sin $\omega t$, and the signal on line 74 may comprise a similar pulse train at phase values of $\pi/2$, $3\pi/2$, etc. of the same function.

The signal representing SGN sin $\omega t$ is input to sine wave generator 76, and the sine wave generator produces a signal proportional to sin $\omega t$ on line 78. The signal on line 78 is input to a servo system that causes the accelerometers to vibrate along the Y axis at frequency $\omega$. The servo system comprises summing junction 80, solenoid drive 82 and demodulator 84. The sin $\omega t$ signal on line 78 is input to summing junction 80, and the output of the summing junction on line 86 is input to solenoid drive 82 that includes a high gain amplifier. The output of solenoid drive 82 is used to drive the solenoids of accelerometer assembly 30 to produce a vibratory motion of the accelerometers along the Y axis. The motion of the accelerometers is sensed by LVDT 60, and the output of the LVDT is demodulated by demodulator 84 to produce feedback signal that is input to summing junction 80 via line 88. Summing junction 80 receives the feedback signal and further receives an alignment signal on line 90 from alignment channel 92, and combines such signals with the signal on line 78 with the polarities indicated in FIG. 3. The function of the alignment signal is described below. As is well known to those skilled in the art, the gain provided by solenoid drive 82 can be made very high, such that the vibratory motion of accelerometers 10 and 12 closely tracks the signal sin $\omega t$ on line 78.

Accelerometers 10 and 12 produce output signals $a_1$ and $a_2$ respectively, and the output signals are transmitted over lines 100 and 102 respectively to preseparation processor 104. Operation of the system is most easily understood by looking first at the ideal case in which the accelerometers and their associated circuitry have no errors due to scaling, phase shift, or misalignment, so that $a_1$ and $a_2$ may be considered as either inputs (accelerations sensed) or outputs, and in which input rate $\Omega_x$ is constant so that there are no angular acceleration terms. Preseparation processor 104 shown in FIG. 3 is appropriate for a paired accelerometer arrangement of the type shown in FIG. 1 where the force sensing axes are antiparallel to one another.

In such an arrangement, the total accelerations sensed by the accelerometers are given by:

$$a_1 = A_z + 2\rho\Omega_x \omega \cos \omega t \qquad (4)$$

$$a_2 = -A_z + 2\rho\Omega_x \omega \cos \omega t \qquad (5)$$

where $a_1$ and $a_2$ are the total acceleration sensed by accelerometers 10 and 12 respectively, $A_z$ is the linear acceleration along the Z axis, $\rho$ is the amplitude of vibration along the Y axis, $\Omega_x$ is the angular rate about the X axis, and $\omega$ is the vibration frequency. The amplitude $\rho$ corresponds to $R\theta$ in Equations (2) and (3). The linear acceleration terms in Equations (4) and (5) have opposite signs due to the opposite directions of the sensitive axes of accelerometers 10 and 12. The Coriolis terms in Equations (4) and (5) have the same signs because both the sensitive axes and the vibrational velocity of the accelerometers are opposite to one another, thereby producing Coriolis accelerations that act in the same direction relative to the respective sensitive axes.

Preseparation processor 104 comprises summing junctions 106 and 108. Summing junction 106 adds the $a_1$ and $a_2$ signals, and summing junction 108 subtracts the $a_1$ and $a_2$ signals. As may be appreciated from Equations (4) and (5) above, the linear acceleration components are eliminated by summing junction 106, and the result is a Coriolis signal on line 110 proportional to rotation rate $\Omega_x$. This Coriolis signal on line 110 is input to scaling amplifier 114, and the resulting scaled Coriolis signal on line 118 is input to angular rate channel 120 and to alignment channel 92. In a similar manner, the Coriolis components are eliminated by summing junction 108, and the result is a linear acceleration signal proportional to $A_z$ on line 112. The linear acceleration signal is input to scaling amplifier 116, and the resulting scaled linear acceleration signal on line 122 is input to linear acceleration channel 124. It will be appreciated that if the sensitive axes of accelerometers 10 and 12 were parallel rather than antiparallel, that summing junction 106 would subtract the $a_1$ and $a_2$ signals and summing junction 108 would add the $a_1$ and $a_2$ signals.

Angular rate channel 120, alignment channel 92 and linear acceleration channel 124 each comprises at least one integration circuit and a sample and hold circuit. Both the angular rate channel and the alignment channel receive the scaled Coriolis signal on line 118 as an input signal, and the linear acceleration channel receives the scaled linear acceleration signal on line 122 as an input signal. In response to control signals generated by control signal generator 70 on line 126, each channel integrates its input signal over one full cycle of the vibration period $2\pi/\omega$, and stores the result of such integration in its sample and hold circuit. Preferably, the rate channel includes two integrators that are alternately used to perform the required integrations, so that the commencement of an integration is not delayed by the time required to store the result of the preceding integration, and reset the integrator. The alignment channel requires only one integrator, since it need not be reset at each cycle.

Linear acceleration channel 124 integrates its input signal directly, to produce an output signal $A_z$ on line 132. However, the alignment channel and the angular rate channel each modulate their respective input signals prior to integration. The modulation performed by the alignment channel is described below. For angular rate channel 120, the modulation is based upon the SGN cos $\omega t$ function represented by the signal provided on line 74 by control signal generator 70. As is well known, the effect of modulating by SGN cos $\omega t$ and integrating over the period $2\pi/\omega$ is that signals synchronous (i.e., in phase) with cos $\omega t$ are rectified, while DC signals and signals synchronous with sin $\omega t$ cancel. The angular rate channel therefore rectifies the Coriolis components of Equations (4) and (5), to produce an output signal on line 130 proportional to $\Omega_x$. Furthermore, it may readily be shown that modulation by the function SGN cos $\omega t$ followed by integration cancels components in phase with cos $2\omega t$. As a result, both terms of Equation (3) are eliminated, and output signal $\Omega_x$ on line 130 is unaffected by the parallelogram vibration arrangement.

Referring again to FIG. 1, if the sensitive axis of accelerometer 10 is misaligned by angle $\alpha_1$ with respect to the Z axis, then the back-and-forth vibration of the accelerometer will include an acceleration proportional to sin $\alpha_1$ sin $\omega t$ that is directed along the accelerometer's sensitive axis. This acceleration results in a misalignment component, also synchronous with sin $\omega t$, in the accelerometer's output signal $a_1$. Because the misalignment component is synchronous with sin $\omega t$, it will be canceled in angular rate channel 120 and will not affect the angular rate output $\Omega_x$. A similar analysis holds for misalignment of accelerometer 12 by angle $\alpha_2$. It may be shown, however, that error due to misalignment of the accelerometers do not cancel if there is a phase shift between the drift signal sin $\omega t$ on line 78 and the actual motion of the accelerometers along the Y axis. If there is a non-zero phase shift $\Phi$, the result will be a rate bias $\Omega_b$ produced by angular rate channel 120 that is given by Equation (1) above. The terms $a_1+a_2$ and the angle can be set to very small values by appropriate calibration procedures, such as the calibration procedures described in U.S. Pat. No. 4,510,802. Such calibration procedures, however, are subject to drive over time. In accordance with the present invention, the rate bias set forth in Equation (1) above is continuously nulled by means of feedback through alignment channel 92.

Alignment channel 92 receives as input the scaled Coriolis signal on line 118, modulates such signal by the function SGN sin $\omega t$, and then integrates the modulated signal over each full cycle of the vibration period $2\pi/\omega$. The resulting feedback signal on line 90 is input to summing junction 80, where it is combined as indicated with the drive signal sin $\omega t$ and with the feedback signal on line 88 to produce a net drive or error signal on line 86. Modulation by SGN sin $\omega t$, followed by integration without reset, causes the components proportional to cos $\omega t$ to cancel, and provides a feedback signal that is proportional only to the integral of the components of the scaled Coriolis signal that are synchronous with sin $\omega t$. The combination of signals at summing junction 80 results in a feedback signal on line 88 having a DC component that tracks the DC or slowly varying feedback signal on line 90, thereby continuously driving the Coriolis components synchronous with sin $\omega t$ to a null value. The components that are nulled include not only the misalignment component described above, but also other error signals as well as signal caused by angular accelerations. A further benefit of alignment channel 92 is that it provides an optimal DC signal for loop closure of the vibration servo system. As a result, the feedback elements exemplified by LVDT 60 and demodulator 84 are no longer required to have a DC response, and AC elements can be used.

Figure 4:
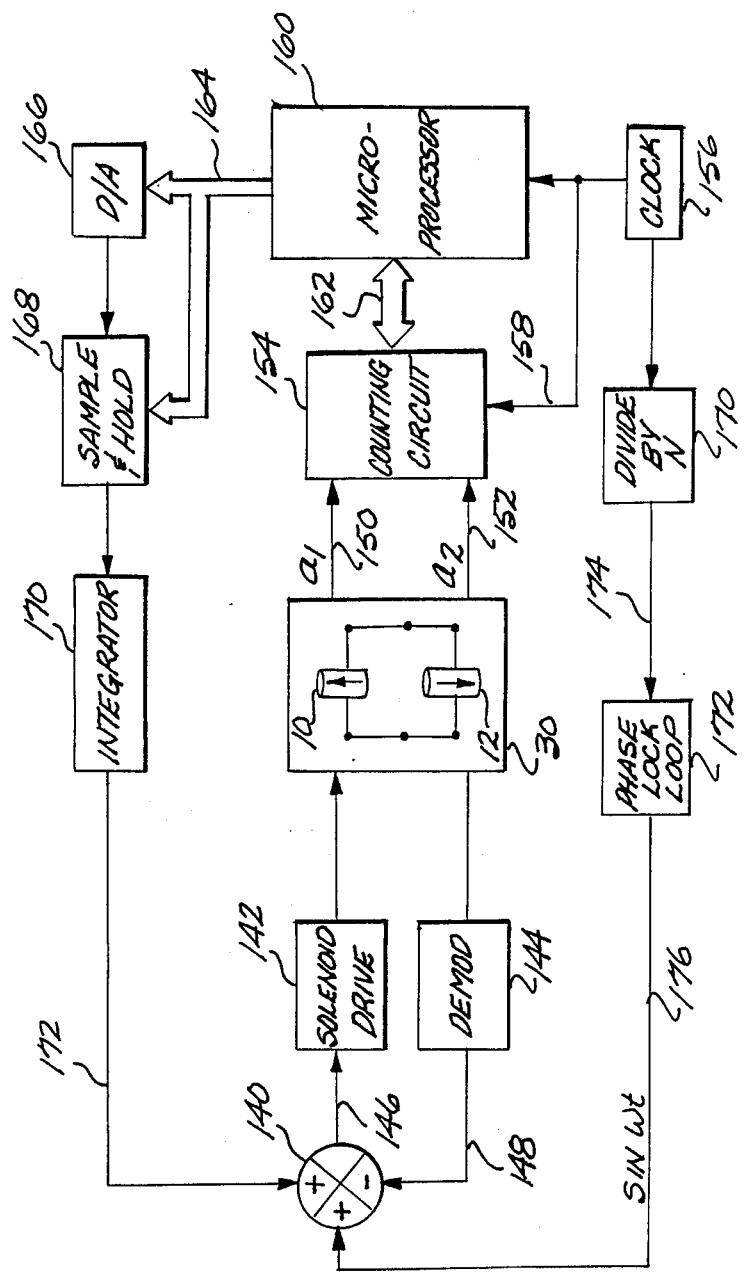
FIG. 4 is a block diagram of a system according to the present invention for determining angular rate using frequency output accelerometers.

FIG. 3 illustrates the application of the present invention to a system in which accelerometers 10 and 12 produce analog output signals. FIG. 4 illustrates a corresponding system in which accelerometers 10 and 12 are frequency output accelerometers, i.e., accelerometers such as vibrating beam accelerometers in which the frequency of each output signal is a function of the sensed acceleration. The embodiment of FIG. 4 includes summing juction 140, solenoid drive 142 and demodulator 144 that may be identical to the corresponding elements of the analog embodiments shown in FIG. 3. The drive signal sin $\omega t$ is derived from clock 156 through divide by N circuit 170 and phase lock loop 172. Divide by N circuit 170 divides the high frequency signal produced by clock 156 to produce a signal on line 174 having a frequency $\omega$ on the order of 100 Hz. The low frequency signal on line 174 is input to phase lock loop 172, and the phase lock loop converts such signal to a sinusoidal signal sin $\omega t$ of the same frequency on line 176. The sinusoidal signal on line 176 is input to summing junction 140, and operates in a manner identical to the drive signal provided to summing junction 80 on line 78 of the embodiment of FIG. 3.

Accelerometers 10 and 12 produce output signals $a_1$ and $a_2$, on lines 150 and 152 respectively, that have frequencies corresponding to the accelerations sensed by the respective accelerometers. The output signals on lines 150 and 152 are input to counting circuit 154. Also input to counting circuit 154 is a high frequency clock signal on line 158 generated by clock 156. Counting circuit 154 counts the cycles of the $a_1$ and $a_2$ signals and the clock signal on line 158. Microprocessor 160 inputs such counts via bus 162, and performs appropriate calculations to determine angular rate $\Omega_x$ and linear acceleration $A_z$.

A suitable technique for processing the outputs of frequency output accelerometers to determine linear acceleration (or, equivalently, velocity change $\Delta V_z$ over a prescribed time interval) is described in U.S. patent application, Ser. No. 789,752, filed concurrently herewith, inventor Rex B. Peters, entitled "Accelerometer with Velocity Change Output." As described therein, the change in velocity $\Delta V_z$ over time period T is given by:

$$\Delta V_z = A[\Delta\Phi + FT + B\Sigma\Phi] \quad (6)$$

where $\Delta\Phi$ is the difference between the phase changes of the accelerometer output signals over time T, $\Sigma\Phi$ is the sum of the phase changes of the output signals over time interval T, and A, F, and B are constants.

A suitable technique for processing the outputs of frequency output accelerometers to determine angular rate is described in U.S. patent application, Ser. No. 789,657, filed concurrently herewith, inventor Rex B. Peters, entitled "Synchronous F M Digital Detector." As described therein, the angular change $a\theta_x$ over a vibration period may be determined by first demodulating the output signals with the function SGN cos $\omega t$, whereupon the angular change may be determined from:

$$\Delta\theta_x = \Sigma\Phi_d + b\Delta\Phi_d \quad (7)$$

where $\Delta\Phi_d$ is the difference between the phase changes of the demodulated output signals over a vibration period, and $\Sigma\Phi_d$ is the sum of the phase changes of the demodulated output signals over the same vibration signal, and where a and b are constants. One suitable technique for demodulating the accelerometer output signals comprises counting cycles of each such signal in a counter and sampling the counters four times during each vibration period. For example, if $C_1 \ldots C_5$ represent five of such consecutive samples of the counter for signal $a_1$ from accelerometer 10, then the phase change of signal $a_1$, over one vibration period demodulated by SGN cos $\omega t$ is:

$$\Phi_c = C_1 + C_2 - C_3 - C_4 \quad (8)$$

The $\Phi_c$ values for the two accelerometers may be used in Equation (7) above to determine angular rate and angular change. The same samples may be simply added to produce the phase change of the undemodulated $a_1$ signal ($\Phi_{DC}$) as follows:

$$\Phi_{DC} = C_1 + C_2 + C_3 + C_4 \quad (9)$$

The $\Phi_{DC}$ values for the two accelerometers may be used in Equation (6) above to determine linear acceleration and velocity change.

The functions performed by alignment channel 92 in the analog embodiment of FIG. 3 are performed in the FIG. 4 embodiment by microprocessor 160 in conjunction with digital to analog converter (D/A) 166, sample and hold circuit 168 and integrator 170. Mircoprocessor 160 first demodulates each output signal $a_1$ and $a_2$ by SGN sin $\omega t$ as follows:

$$\Phi_s = C_2 + C_3 - C_4 - C_5 \quad (10)$$

The microprocessor then computes the quanity $\Phi_{S1}+\Phi_{S2}$, where the subscripts 1 and 2 refer to signals $a_1$ and $a_2$, respectively, to produce a digital misalignment signal, and outputs the digital misalignment signal on bus 164. The misalignment signal on bus 164 is converted to an analog signal by digital to analog converter 166, and the resulting analog signal is input to sample and hold circuit 168. The sample and hold circuit samples the analog misalignment signal once each period of the drive signal sin ωt. The output of the sample and hold circut is input to integrator 170, to provide the appropriate feedback signal on line 172 that is input to summing junction 140. The feedback signal on line 172 coresponds to the feedback signal output by alignment channel 92 on line 90 in the embodiments shown in FIG. 3.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A device for generating a signal representing the angular rate of motion of a body, comprising:
   a first accelerometer having a first force sensing axis and being adapted to produce a first output signal indicative of acceleration along the first force sensing axis;
   a second accelerometer having a second force sensing axis and being adapted to produce a second output signal indicative of acceleration along the second force sensing axis;
   mounting means for mounting the first and second accelerometers such that their force sensing axes are both parallel to a common sensing axis and such that the accelerometers can be moved along a vibration axis normal to the sensing axis;
   signal generator means for producing a periodic drive signal having a predetermined frequency;
   drive means connected to the mounting means and responsive to the drive signal for vibrating the first and second accelerometers along the vibration axis at said predetermined frequency; and
   signal processing means connected to receive the first and second output signals and adapted to generate a Coriolis signal representing the Coriolis acceleration along the sensing axis resulting from movement of the accelerometers along the vibration axis and rotation of the body about a rate axis normal to the vibration axis and to the sensing axis, the signal processing means including detection means connected to receive the Coriolis signal and to produce a feedback signal that is a function of those components of the Coriolis signal that are in phase with respect to the drive signal, the drive means including means for combining the feedback signal with the drive signal such that said components are driven towards a null value.

2. The device of claim 1, wherein the detection means comprises means for producing an analog signal having a magnitude corresponding to the amplitude of said components of the Coriolis signal that are in phase with respect to the drive signal, and means for integrating the analog signal to produce the feedback signal.

3. The device of claim 1, wherein the mounting means comprises a parallelogram mechanism including a first support member secured to the first accelerometer, a second support member secured to the second accelerometer, and a linkage mechanism attached to the first and second support members and secured to the body such that the first and second support members are parallel to the vibration axis.

4. The device of claim 3, wherein the linkage mechanism includes a first linkage member pivotally connected to the first and second support members, a second linkage member pivotally connected to the first and second support members, the first and second linkage members each being pivotally secured to the body.

5. The device of claim 4, wherein the drive means includes solenoid means secured to the body and to the first and second linkage members.

6. The apparatus of claim 4, wherein the first and second linkage members are pivotally connected to the first and second support members by flexure hinges.

7. The device of claim 4, wherein the drive signal is a sinusoidal signal, and wherein the drive means comprises LVDT means for producing a second feedback signal indicative of the position of the mounting means and accelerometers.

8. The device of claim 1, wherein the first and second output signals are analog signals, and wherein the signal processing means comprises junction means for combining the first and second output signals to produce the Coriolis signal.

9. The device of claim 8, wherein the detection means includes modulation means for modulating the Coriolis signal with a signal in phase with the drive signal and means for integrating the modulated Coriolis signal to produce the feedback signal.

10. The device of claim 9, wherein the first and second force sensing axes are antiparallel to one another, and wherein the junction means is operative to add the first and second output signals to produce the Coriolis signal.

11. The device of claim 8, wherein the signal processing means includes amplifier means for scaling the Coriolis signal.

12. The device of claim 9, wherein the signal processing means comprises an angular rate channel operative to modulate the Coriolis signal by a modulation function in quadrature phase with respect to the drive signal and to integrate the modulated Coriolis signal to produce a rate signal and to integrate the modulated Coriolis signal to produce a rate signal indicative of rotation rate about the rate axis.

13. The device of claim 1, wherein the first and second output signals are signals having frequencies corresponding to the respective accelerations, and wherein the signal processing means comprises counting means operative to count cycles of the first and second output signals and of a clock signal having a frequency greater than the first and second output signals.

14. The device of claim 13, wherein the signal processing means comprises:
   means for sampling the counting means at least twice during each period of the drive signal to produce a sequence of digital count values repersenting phase changes of the first and second output signals; and
   alignment means for algebraically combining the count values so as to demodulate each output signal by a periodic signal in phase with the drive signal to produce a digital misalignment signal.

15. The device of claim 14, wherein the signal processing means comprises means for converting the digital misalignment signal to an analog misalignment signal, and means for integrating the analog misalignment signal to produce the feedback signal.

16. The device of claim 14, wherein the signal processing means further comprises angular rate means for algebraically combining the count values so as to demodulate each output signal by a periodic signal in quadrature phase with respect to the drive signal to produce a rate signal indicative of rotation rate about the rate axis.

* * * * *

UNITED STATES PATENT AND TRADEMARK OFFICE
CERTIFICATE OF CORRECTION

PATENT NO. : 4,665,748
DATED : May 19, 1987
INVENTOR(S) : Rex B. Peters

Page 1 of 2

It is certified that error appears in the above-identified patent and that said Letters Patent is hereby corrected as shown below:

Abstract, line 14, "deive" should be --drive--.
Column 1, line 55 (Equation 1), "$\Omega_b = (\omega/4)(\alpha_1 + \alpha_2)\sin\psi$"

should be --$\Omega_b = (\omega/4)(\alpha_1 + \alpha_2)\sin\phi$--.

Column 2, line 25, "accelermeters" should be --accelerometers--.
Column 6, line 53, "backand-forth" should be --back-and-forth--.
Column 7, line 28, "mislignment" should be --misalignment--.
Column 7, line 29, "signal" should be --signals--.
Column 7, line 44, "juction" should be --junction--.
Column 8, line 23, "F M" should be --FM--.
Column 8, line 24, "$\alpha\theta_x$" should be --$\Delta\theta_x$--.

Column 8, line 30 (Equation 7), "$\Delta\theta_x = \Sigma\Phi_d + b\Delta\Phi_d$"

should be --$\Delta\theta_x = a\Sigma\Phi_d + b\Delta\Phi_d$--.

Column 8, line 63, "170" should be --180--.
Column 9, line 1, "quanity" should be --quantity--.
Column 9, line 11, "170" should be --180--.
Column 9, line 12, "172" should be --182--.
Column 9, line 13, "172" should be --182--.
Column 9, line 14, "coresponds" should be --corresponds--.
Column 10, lines 49 and 50, delete "and to integrate the modulated Coriolis signal to produce a rate signal" (second occurrence).
Drawing sheet 3, figure 4, reference numeral for block labeled "INTEGRATOR" should be --180--.

UNITED STATES PATENT AND TRADEMARK OFFICE
CERTIFICATE OF CORRECTION

PATENT NO. : 4,665,748

DATED : May 19, 1987

INVENTOR(S) : Rex B. Peters

It is certified that error appears in the above-identified patent and that said Letters Patent is hereby corrected as shown below:

Drawing sheet 3, figure 4, reference numeral for line between INTEGRATOR block (180) and summing junction 140 should be -- 182 --.

Signed and Sealed this

Second Day of February, 1988

Attest:

DONALD J. QUIGG

*Attesting Officer*     *Commissioner of Patents and Trademarks*